UNITED STATES PATENT OFFICE.

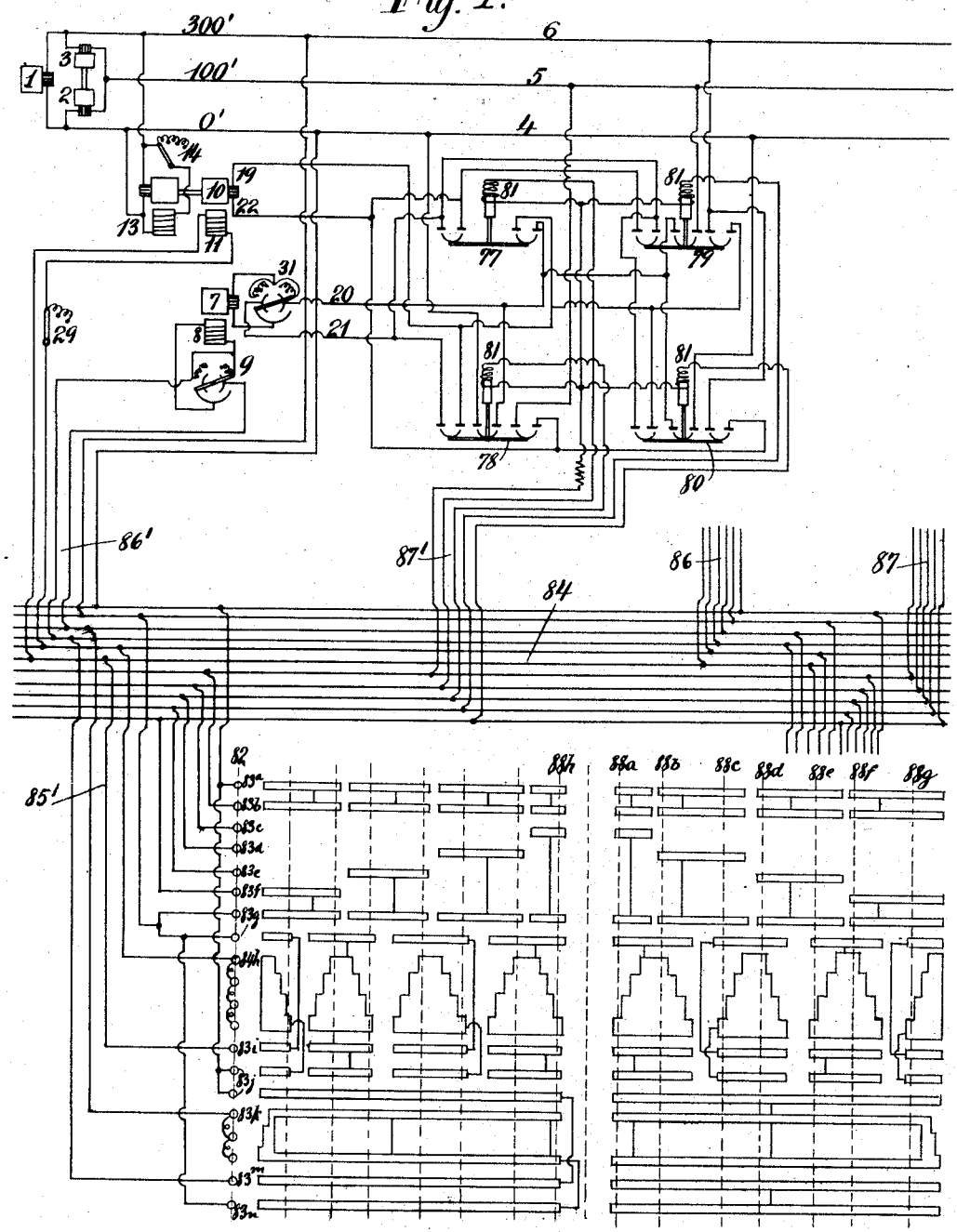

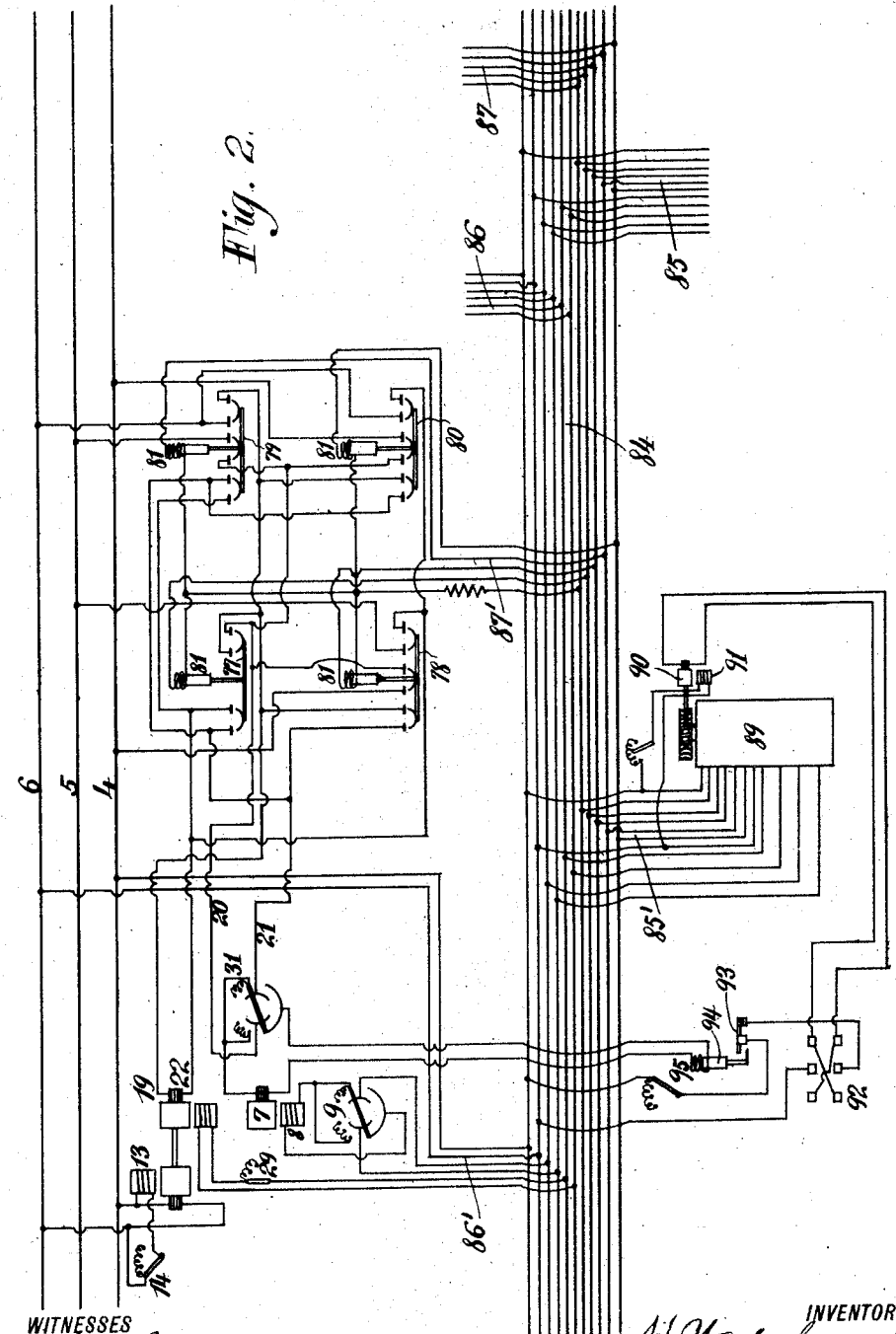

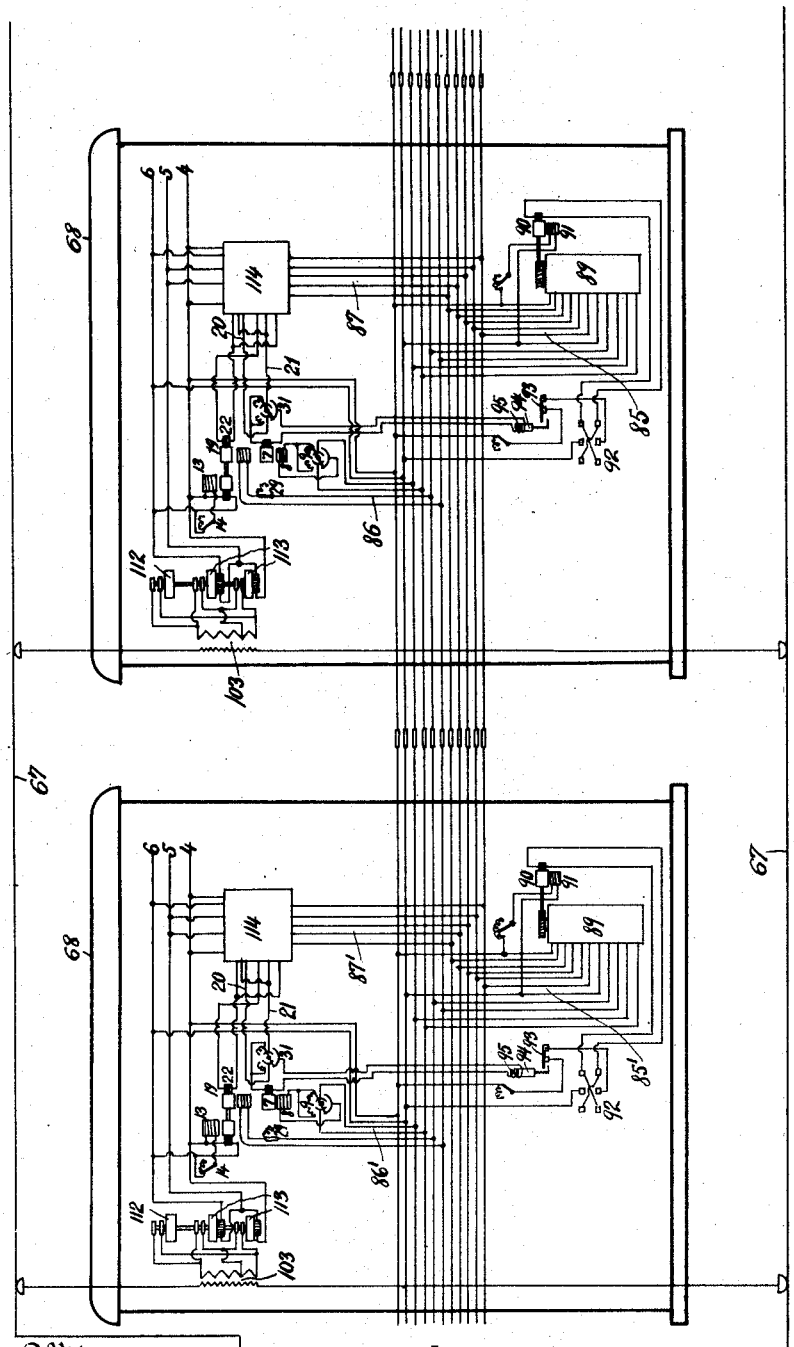

HARRY WARD LEONARD, OF BRONXVILLE, NEW YORK.

MEANS FOR CONTROL OF ELECTRIC ENERGY.

1,043,777.        Specification of Letters Patent.        Patented Nov. 5, 1912.

Original application filed December 7, 1905, Serial No. 290,683. Divided and this application filed September 18, 1911. Serial No. 649,901.

*To all whom it may concern:*

Be it known that I, HARRY WARD LEONARD, a citizen of the United States, residing at Bronxville, in the county of Westchester and State of New York, have invented certain new and useful Improvements in Means for Control of Electric Energy, of which the following is a full, clear, and exact specification.

The present application is a division of my application filed December 7, 1905, Serial Number 290,683, granted Sept. 19, 1911, Patent No. 1,003,925.

My invention relates to the control of electrical energy, and an important application is the speed control of electric motors, although it is useful for the control of many other forms of translating devices such as storage batteries, electric furnaces, electric lights, transformers and other devices.

Among the objects of my invention are the improvement of the control of the electric energy received or delivered by such devices, while maintaining the advantages of the reduction of size, first cost and depreciation of the installation required and the improvement in the efficiency and reliability of the installation as explained in my said original application.

My invention is particularly desirable for controlling motors in factories, electric elevators, printing establishments, installations on shipboard, traveling cranes, mining installations, railway trains, storage battery installations, and in fact in any case where refinement of control, efficiency, freedom from depreciation, reduced first cost, or reliability of service are to be considered important factors.

My invention is especially well adapted to existing types of continuous current motors, but is also applicable and desirable for systems employing current of alternating, pulsating or interrupted form.

It also presents many advantages when the source of electrical energy supplied is in the form of continuous or alternating current and where it may be desirable to employ motors requiring a current differing in some characteristics from the current supplied by the source.

It also has advantages for motors which are to be used with different forms of energy supplied under different conditions, such as in railway operations where the character of the supply system is changed in passing through different sections.

More particularly my invention has the object of providing simple and efficient automatic controlling means for securing the desired control of the electric energy as utilized in the translating device and as regenerated thereby; providing controlling means whereby the control exercised by the operator is easily and properly accomplished as desired; providing means which will prevent improper operation; and providing an improved remote and multiple unit control.

My invention has various other objects and applications not referred to specifically herein and is capable of being practised in different ways and embodied in constructions which may differ widely from each other. I am therefore limited in the scope thereof only as indicated by the appended claims.

My invention will be understood from the following description read in connection with the accompanying drawings:

Figure 1 is a diagram of apparatus and connections embodying certain features of my invention including remote and multiple unit control; Fig. 2 is a diagram of similar apparatus with automatic governing means; and Fig. 3 is a similar diagram illustrating the application to multiple unit train control.

Referring to Fig. 1, a main source of energy is indicated at 1, which in the present instance is assumed to be a source of direct current. Between the supply mains from this source are connected two dynamo electric machines 2, 3 and from the outside terminals and from the intermediate connection extend the three supply mains 4, 5 and 6. The machines 2, 3 are mechanically coupled and rotate at a constant speed operating to maintain constant potentials on the three supply mains in a manner now well understood. I have assumed that the electromotive force of machine 2 is 100 volts and that of machine 3 to be 200 volts, thus I have indicated the potential of line 4 as 0', that of line 5 as 100', and that of line 6 as 300'. The translating device to be controlled is shown as a motor having the armature 7 and field 8. The field 8 is supplied with energy from the outside supply mains through a reversing switch 9 by which the strength and polarity of the field may be controlled. The variable source of electromotive force is shown as a dynamo electric machine having the armature 10 and field 11, the latter being excited by windings deriving energy from the outside mains. The armature 10 is shown as being driven in the present instance by a motor 13, and a rheostat 14 is shown connected in the field circuit thereof for the purpose of varying its speed if desired. The motor 13 may be assumed to run at a practically constant speed driving the armature 10 at a constant speed. By properly manipulating the various devices shown any desired speed of the motor may be obtained without the use of resistances in the armature circuit and solely by what may be termed voltage control. We may assume that the current capacity of the motor controlled and that of the variable source of electromotive force is the same, that the electromotive force of the armature 10 is 50 volts and that the maximum electromotive force of the armature 7 to be controlled is 350 volts. Under these conditions the watt capacity of the regulating and controlling means is only one-seventh of that of the motor controlled.

Although the desired operation of the apparatus may be obtained as described in my said original application with reference to Fig. 1 thereof, it is of course desirable in practice to preferably attain the result by means of a single operating handle, lever or other controlling means. This result may be obtained by a controlling switch of the drum type in which a set of stationary fingers engage contacts upon a rotatable drum or cylinder, which contacts are suitably insulated and interconnected. In this type of switch it will be in some cases desirable to make the movement quick acting, introduce a multiplicity of breaks when the circuits are interrupted, provide means to minimize the objectionable effects of arcing, such as by providing a magnetic blow-out; provide means to emphasize desirable running points, such as the star wheel; and to otherwise improve the construction and operation. These, however, form no part of my invention and as such constructions are now well understood, it is unnecessary to illustrate the detailed construction.

Instead of controlling the apparatus directly by hand control, I introduce intermediate automatic means, and also secure control from one or more distant points. Such an arrangement is necessary where the operator is at a considerable distance from the apparatus, for example; when my invention is applied to the operation of elevators. It is also important in many cases to simultaneously control a plurality of motors by means of a single controlling device and to control the same motors from a number of points, such as in the operation of trains.

Fig. 1 illustrates diagrammatically apparatus by which these requirements are fulfilled. In this figure the leads from the armatures 7, 10 are connected to contacts of automatic switches 77, 78, 79 and 80. These switches are closed by the action of coils 81, which when excited, raise their cores and close the switches. In order to identify these switches or their equivalents, they may at times be referred to hereinafter as contactor type switches. The connections of switches 77 to 80 are such that when any one is closed a desired relation of the armatures 7, 10 to each other and to the mains 4, 5, 6 is secured. In the figure are shown a set of contacts on line 82 and the development of contacts on the drum of a controlling switch, which contacts are adapted to be engaged by those on line 82 when the controlling drum is operated. This controlling switch may be located at any desired distant point and is adapted to control the circuits of the coils 81 and also the direction and strength of the field 11 of the variable source of electromotive force and of the field 8 of the motor controlled. The contacts on line 82 begin at the top and going down are connected as follows: Contact $83^a$ is connected to main 4, contact $83^b$ is connected to one terminal of each of the coils 81, contact $83^c$ is connected to the remaining terminal of coil 81 of the switch 77, contact $83^d$ is connected to the remaining terminal of coil 81 of the switch 78, contact $83^e$ is connected to the remaining terminal of coil 81 of the switch 79, contact $83^f$ is connected to the remaining terminal of coil 81 of the switch 80, the next two contacts $83^g$ are connected to the main 6, contact $83^h$ is connected to the terminal of the circuit of field 11 and then follow a set of field resistance contacts, contact $83^i$ is connected to the other terminal of the circuit of field 11, the next two contacts $83^j$ are connected to the main 4, contact $83^k$ is connected to one terminal of the circuit of field 8 and then follow a set of resistance contacts, contact $83^m$ is connected to the remaining terminal of the circuit of field 8, and contact $83^n$ is connected to main 6.

I have shown the mains 84 to which the controlling devices and contacts 83 are connected as through conductors, so that any number of controlling devices may be connected to the conductors 84 and operated simultaneously by means of the single controlling switch just described. Also any number of controlling switches may be connected to the through mains 84 and control the devices from other points of control as desired. I have therefore indicated the mains 85, which are adapted to be connected to another controlling switch and I have also indicated the mains 86, 87 which are adapted to be connected to another set of devices and to the mains 4, 5, 6, these mains corresponding to the mains 85′, 86′, and 87′ respectively.

I will now describe the operation of the controlling switch shown, and it will be understood that the operation of additional switches will be the same and control additional devices in the same manner.

The switch is adapted to secure forward rotation of the motor controlled by movement in one direction, and to secure reversed rotation of the motor controlled by movement of the controlling switch in the opposite direction, and also to secure full speed of the motor in each direction. For forward operation it may be assumed that the controlling switch is moved from off position so that the contacts on line 82 engage the drum contacts on line 88$^a$; connection is then made from main 4 to the coil of switch 77 and thence through the controlling switch to the main 6. This causes the automatic switch 77 to be closed, by which the armatures 10 and 7 are connected in a local loop. At the same time the circuit of field 11 is closed across the mains 4, 6 with resistance in its circuit. This causes the armature 10 to generate a low electromotive force which is supplied to the armature 7. The field of the armature 7 is fully excited by the movement of the controlling switch at this time, being connected across the mains 4, 6 and without resistance in its field circuit. Movement of the controlling switch will cause the resistance in the circuit of field 11 to be gradually cut out and thus increase the electromotive force supplied by armature 10 to the armature 7. When contact is made on line 88$^b$, the field connection will be unchanged but the coil of switch 77 will be deënergized and the coil of switch 78 will be energized. Switch 77 will therefore be opened, and switch 78 will be closed. The closing of this switch causes the armatures 10 and 7 to be connected in series across the mains 4, 5 so that the electromotive force of armature 10 opposes that of the mains 4, 5 as above described. Further movement of the controlling switch will weaken the field 11 by the insertion of resistance in its circuit. This causes the electromotive force applied to armature 7 to approach that between the mains 4, 5. When contact is made on line 88$^c$, the connections of the circuit of field 11 are changed so that the armature 10 will generate a low reversed electromotive force, so that the resultant electromotive force applied to armature 7 will be equal to that between the mains 4, 5 plus that generated by armature 10.

Further movement of the controlling switch gradually cuts out resistance from the circuit of field 11 so that the electromotive force of armature 10 and consequently that of armature 7 is gradually increased. When contact is made on line 88$^d$, the coil of switch 78 is deënergized causing this switch to be opened and the coil of switch 79 is closed which will cause the switch 79 to be closed automatically. The connections of the contacts of switch 79 are such that the armatures 10 and 7 will be connected in series across the mains 5, 6 and the electromotive force of armature 10 will oppose that of the mains. Movement of the controlling switch will now insert resistance and weaken field 11, and as the counter volts of armature 10 gradually decrease, the electromotive force applied to armature 7 will gradually approach that between mains 5, 6. At position 88$^e$, the field 11 is reversed causing the armature 10 to generate electromotive force in the same direction as that of the mains 5, 6 and as the switch is moved more this additive electromotive force is gradually increased. At position 88$^f$, the coil of switch 79 is deënergized and the coil of switch 80 is closed, causing the closing of the automatic switch 80. The switch 80 will cause the armatures 10 and 7 to be connected in series across the mains 4, 6, so that the electromotive force of armature 10 is counter to that of the mains. Further movement of the controlling switch will insert resistance in the circuit of field 11 and cause the counter volts of armature 10 to be gradually decreased. At position 88$^g$ the field 11 is reversed which will cause the armature 10 to act with the line electromotive force, and when the switch is moved further the volts applied to the motor controlled will be gradually increased to the voltage of the outside mains plus the full voltage of the armature 10. Further movement will cause the field 8 of the motor controlled to be weakened by inserting resistance gradually in the field circuit, giving full speed forward. When the controller is turned back to the off position the same connections will of course be made in the reverse order. When the controller is moved from off position so that the contacts are on line 88$^h$, reverse rotation of the motor controlled will result owing to the field connections of the motor being reversed at the controlling switch. The connections made in this position 88$^h$ are otherwise the same as those made in position 88$^a$, the armatures 10, 7 being connected in a local loop by the switch 77. Continued movement of the controlling switch in the reverse direction will secure the same sequence of connections as described with reference to the movement of the switch to secure forward rotation, as in passing through the successive positions 88$^a$ to 88$^g$, the only difference being that the field circuit of the motor controlled is reversed. Thus a single controlling switch secures forward and reverse rotation of the driven motor to full speed in each direction. Also with a switch of this type, the currents flowing through the same are very small and the size of conducting wires and other parts is very greatly reduced so that only a comparatively small controlling switch is required. It is evident that this switch may be any desired distance from the apparatus controlled, that it will control similar apparatus which may be connected to the mains 84, and that other similar switches may be connected to the mains 84 at other points and control the same apparatus.

In some cases it will be desired to have the action of the switches entirely automatic so that when a circuit is closed by a switch the sets of solenoid switches will be operated automatically to bring the motor controlled gradually to its full speed, and also to bring the motor gradually to rest automatically when another circuit is closed or the circuit first referred to opened. The automatic action of the switches in such cases will preferably be made to depend upon the counter electromotive force of the motor controlled, and in carrying this into effect the invention described in my pending application Serial No. 236,439 filed December 12, 1904, may be employed.

Instead of operating the controlling switch of Fig. 1 by hand, it will sometimes be desirable to operate this by a small pilot motor, which pilot motor may be controlled in either direction by simply throwing a double throw switch to one closed position or the other. Such an arrangement is shown in Fig. 2 in which the controlling switch of Fig. 1 with the wires leading thereto is shown at 89. In order to identify this controlling switch 89 or its equivalent, it may at times be referred to hereinafter as a multiple unit controller. This has a gear mounted on its shaft and in engagement with the gear is indicated a worm driven by the armature 90 of the pilot motor. The field 91 of this pilot motor has its circuit connected to give constant strength under normal conditions, although its strength may be adjusted by a rheostat in its circuit to give a desired strength. A circuit to the armature 90 which extends from some constant potential source, includes a double throw reversing switch 92 and an adjustable resistance to determine the current flow. In order to identify this switch 92 or its equivalent, it may at times be referred to hereinafter as a master-switch. The switch 92 will cause the motor controlling the switch 89 to operate in one direction when closed one way and in the reverse direction when closed the other way so that any desired position of the switch 89 can be secured and thus operate the driven motor at any speed or in any direction desired. If desired the switch 92 for the pilot motor may be made a regulating switch having resistances to control the speed of the pilot motor. I prefer to insert some protective means in the circuit of the pilot motor so that if the driven motor is subjected to a too rapid variation of electromotive force, the pilot motor will be automatically stopped and prevent any further change of the controlling switch 89 until normal conditions are restored. This result is accomplished by the insertion of a switch 93 in the armature circuit of the pilot motor, which switch is automatically controlled by the core 94 of a solenoid 95, which solenoid is in series with the armature of the driven motor. If the current in the armature circuit of the driven motor becomes excessive by reason of a too rapid movement of the controlling switch, the core 94 will be raised and open the switch 93 and thus automatically stop the pilot motor. When the current in the armature circuit of the driven motor decreases to a normal amount, the core 94 will be moved downward and permit the switch 93 to close and the pilot motor may then continue to operate.

It will, of course, be understood as already explained and indicated by the circuits 86, 87 and 85, that when there is another unit, there will be on such additional unit substantially the same apparatus as has been described, so that from any one of the units the operator can, by operating the master-switch on that unit corresponding to the switch 92, effect a multiple unit control, so that the units will be accelerated, retarded, reversed, etc., in unison and with a division of the total common load between the motors of the several units, with means effecting automatic protection against excessive currents. Fig. 3 illustrates this application of my invention more clearly than shown by Fig. 2. Two cars or locomotive units 68 comprising a train are indicated in the diagram with apparatus corresponding to that shown in Fig. 2 upon each of the units. A stationary single phase source is shown at 66, to which the conductors 67 are connected, as illustrated in Fig. 20 of my said original application, from which the present case is divided. The high tension current is led upon the cars and the voltage is reduced on the cars by means of static transformers 103. In order to maintain the required potentials upon the multiple voltage mains, rotary converters may be used as explained in my said original application. A synchronous motor 112 is supplied from each of the static transformers. On the shaft of each of the synchronous machines 112 are mounted two rotary transformers or rectifiers 113. The brushes bearing upon the collector rings of these rectifiers are connected to taps from the secondary of each of the transformers 103, which taps are connected to turns in the ratio of that desired upon the multiple voltage mains 4, 5 and 6. From the commutators of the rectifiers 113 extend the multiple voltage mains connected as shown. Of course, any other suitable form of transforming apparatus may be used for deriving the desired voltages for the multiple voltage mains from the source of energy. The apparatus on each locomotive unit 68 corresponds to that shown in Fig. 2 and is indicated by the same reference characters. Instead of reproducing each set of contactor type switches with their connections as shown in Fig. 2, such switches are indicated in Fig. 3 as being contained in the inclosing cases 114 with corresponding connections leading to and from the same.

It will be noted that when the translating device controlled is an electric motor, as in the above illustrations, the motor armature is always generating counter electromotive force and when the armatures 10 and 7 are connected in series across the supply mains, there will be three electromotive forces in the circuit in various relations.

Instead of using a dynamo electric machine for securing the variable and reversible electromotive force other types of apparatus may be used, for example, circuit interrupters adapted to vary the voltage. Also other means for maintaining the required potentials on the multiple voltage mains other than those already described may be used.

An advantage of my invention, which advantage is especially important with regard to the application to railway systems or motor vehicles, is the regeneration of energy by the motors controlled. When the controlling switch or switches are operated to reduce the electromotive force applied to the motor or motors, and thus lower their speed, the motors then act as generators and return energy to the source or sources. This regeneration of energy places a greater or less load upon the motors depending upon conditions and thus produces a braking action which retards the motors. By proper manipulation of the controlling switches, the regeneration of energy may be made to bring the motors to full rest. In railway systems and motor vehicles, the energy restored in stopping and in descending hills may be a very considerable amount.

It will be understood that various auxiliary and protective devices will be desired and preferably used in connection with my present invention, for example, overload and no-voltage and other protective devices. These are not disclosed, however, as their application is well understood.

Having thus described my invention, what I claim as new and desire to secure by Letters Patent is:

1. The combination with a main source delivering a plurality of differing electromotive forces, an auxiliary source of variable electromotive force derived therefrom, a work circuit containing translating devices responsive to varying electromotive force, a plurality of electrically operated switches for connecting the auxiliary source in series relation with any of the electromotive forces of the main source and the work circuit, a control circuit and a controller therein provided with contacts for progressively operating the switches and strengthening the auxiliary source, then opposing it to the main source and weakening it, then reversing its field and opposing to a higher main source, until the maximum combined electromotive force of the highest and main auxiliary sources are in series relation in the work circuit.

2. The combination of a divided source of electromotive force, multiple voltage mains supplied thereby, an auxiliary source of electromotive force, a work circuit, electrically operated switch apparatus for coupling the work circuit in various relations to the main and auxiliary sources to progressively vary the electromotive force between a minimum and the maximum of their joint capacity, a control circuit, and a controller therein for operating the switches in sequence to effect the various relations.

3. The combination with a main source delivering a plurality of electromotive forces, an auxiliary source of variable electromotive force derived therefrom, an electrodynamic work circuit, a plurality of electrically operated switches for connecting the auxiliary sources in series relation with any of the electromotive forces of the main source and the work circuit, a control circuit and a controller therein for progressively connecting the auxiliary source in the work circuit, then opposing it to the main source while still connected with the work circuit and weakening its field, then reversing its field and opposing it to a higher main source, and repeating these operations until the maximum combined electromotive force of the highest main source and of the auxiliary source are in series relation in the work circuit.

4. The combination with a main source delivering a plurality of electromotive forces, an auxiliary source of variable electromotive force derived therefrom, an electrodynamic work circuit, a plurality of electrically operated switches for connecting the auxiliary source in series relation with any of the electromotive forces the main source and the work circuit, a control circuit, and a controller therein for progressively connecting the auxiliary source in the work circuit, then opposing it to the main source while still connected with the work circuit and weakening its field, then reversing its field, and opposing it to a higher main source, and repeating these operations until the maximum combined electromotive force of the highest main source and of the auxiliary source are in series relation in the work circuit, and then weakening the motor field.

5. The combination of an electro-dynamic work circuit, a source of electromotive force, an auxiliary variable source, electrically operated switch mechanism for connecting the two sources in series or opposition in said electrodynamic work circuit to vary the electromotive force from a minimum of the auxiliary source to a maximum of the combined sources in series, a control circuit extending to any desired point, and a controller at said point for operating the switch mechanism to effect any desired range of electromotive force in the work circuit.

6. The combination of an electro-dynamic work circuit, a source of electromotive force, a local auxiliary variable source deriving energy therefrom, electrically operated switch mechanism for connecting the two sources in series or opposition in said electrodynamic work circuit to vary the electromotive force from a minimum of the auxiliary source to a maximum of the combined sources in series, a control circuit extending to any desired point, and a controller at said point for operating the switch mechanism to effect any desired range of electromotive force in the work circuit.

7. The combination of a main source of electromotive force, multiple voltage mains connected therewith, an auxiliary variable source of reversible electromotive force deriving energy therefrom, an electrodynamic work circuit, a plurality of electrically operated switches for progressively connecting the two sources in series throughout maximum range of electromotive force of both sources, a control circuit, and a controller therein for operating the switches and graduating the auxiliary electromotive force to assist and oppose the main electromotive forces progressively in connecting with the several mains, to effect a gradually varying electromotive force over the entire range of capacity of all sources.

8. The combination of a main source of electromotive force, multiple voltage mains connected therewith, an auxiliary variable source of reversible electromotive force deriving energy therefrom, an electrodynamic work circuit, plurality of electrically operated switches for connecting the two sources in series progressively throughout the maximum range of electromotive force of both sources, a control circuit, and a controller therein at any desired point for operating the switches, said controller when operated in one direction bringing the auxiliary source up to speed and connecting it progressively across the multiple voltage mains to gradually increase the motor speed in one direction, and by a reverse movement to produce a similar range of speed in the reverse direction throughout the maximum range of electromotive force of the system.

9. The combination of a plurality of sources of electromotive force, a motor circuit, switches for connecting the motor and sources in series, a control circuit, and a plurality of controllers in said circuit at different points to operate the switches in a desired order to vary the electromotive force on the motor from zero to a maximum of the combined electromotive forces of the several sources.

10. The combination of a plurality of sources of electromotive force, a motor circuit, switches at a plurality of points for connecting the motor and sources in series, a control circuit extending throughout the territory covered by the switches, and a controller to operate the switches in a desired order to vary the electromotive force on the motor from zero to a maximum of the combined electromotive forces of the several sources.

11. The combination of a main source of electromotive force, multiple voltage mains connected therewith, an auxiliary variable source deriving energy therefrom, and a plurality of electrically operated switches for connecting the sources in series and progressively increasing the electromotive force, an electrodynamic work circuit, a control circuit, and a controller therein having its contacts arranged to connect the auxiliary source in a local loop with the work circuit, then to connect it in opposition to the lowest electromotive force of the main source and to cut resistance into the field circuit of the auxiliary source, and to repeat this cycle progressively with the several voltages of the main source until the two sources have their maximum electromotive force in series relation with the work circuit.

12. The combination of a main source of electromotive force, multiple voltage mains connected therewith, an auxiliary variable source deriving energy therefrom, and a plurality of electrically operated switches for connecting the sources in series and progressively increasing the electromotive force, a motor circuit, a control circuit and a controller therein having its contacts arranged to connect the auxiliary source in a local loop with the motor circuit, then to connect it in opposition to the lowest electromotive force of the main source, and to cut resistance into the field circuit of the auxiliary source, and to repeat this cycle progressively with the several voltages of the main source until the two sources have their maximum electromotive force in series relation with the motor circuit.

13. The combination of a main source of electromotive force, multiple voltage mains connected therewith, an auxiliary variable source deriving energy therefrom, and a plurality of electrically operated switches for connecting the sources in series and progressively increasing the electromotive force, a motor circuit, a control circuit and a controller therein having its contacts arranged to connect the auxiliary source in a local loop with the motor circuit, then to connect it in opposition to the lowest electromotive force of the main source and to cut resistance into the field circuit of the auxiliary source, and to repeat this cycle progressively with the several voltages of the main source until the two sources have their maximum electromotive force in series relation with the motor circuit, and additional control contacts for weakening the field of the motor.

14. The combination of a main source of electromotive force, multiple switch mains connected therewith, an auxiliary source having a maximum voltage value fractional with relation to the main source, a plurality of electrically operated switches for connecting the sources in series to produce a progressively increasing electromotive force, an electrodynamic work circuit, a control circuit and a controller in said circuit comparable in capacity to the auxiliary source, having its contacts arranged to connect the auxiliary generator with the work circuit in opposition to the lowest electromotive force of the main source and to reduce said opposition until the work circuit receives the full voltage of the lowest main circuit, then to reverse the auxiliary source and bring it to full strength and connect it in opposition to the next higher main source, and to repeat this cycle successively with the various electromotive forces of the main source.

15. The combination of a multiple voltage source of electromotive force, an electrodynamic work circuit, electrically operated switches for connecting the several voltages successively in said work circuit, a control circuit extending throughout any desired territory, a plurality of controllers therein, electric motors for operating the several controllers, and a control circuit for operating motors.

16. The combination of multiple voltage sources of electromotive force, an electrodynamic work circuit, electrically operated switches for imposing the several voltages progressively on said work circuit, a control circuit extending throughout any desired territory, a plurality of electric controllers having a forward and backward movement to produce variable direct or reverse current in the work circuit throughout the maximum range of electromotive force, electric motors for operating the controllers, a control circuit for the motors, and a reversing switch in the control circuit.

17. The combination of multiple voltage sources of electromotive force, an electrodynamic work circuit, electrically operated switches for connecting the several voltages successively in said work circuit, a control circuit extending throughout any desired territory, a plurality of controllers therein, electric motors for operating the controllers, and a device for protectively controlling the work circuit on abnormal dangerous conditions.

18. The combination of a main source of electromotive force, multiple voltage mains applied thereby, an auxiliary source having a separate field winding adapted to be excited from said mains, an electric motor, a plurality of electric switches for connecting said sources in series or opposition, a control circuit and controllers therein for progressively operating the switches and for raising the electromotive force of the auxiliary source before its connection in opposition with the several multiple voltage sources, and lowering it after such connection.

19. The combination of a multiple voltage source of electromotive force, an electrodynamic work circuit, electrically operated switches for subjecting a plurality of the voltages successively to said work circuit, a control circuit extending throughout any desired territory, a plurality of controllers related thereto controlling the voltage applied to said work circuit, an electromotive force producing translating device connected to said work circuit, and automatic means for operating said controllers at will to cause said translating device to receive energy from said work circuit or deliver energy to said work circuit.

20. The combination of a source of electric energy, a divided source of electromotive force derived therefrom by magnetic induction, an electric motor having a rotatable winding, a plurality of electrically operated switches for connecting said motor winding in series with different combinations of the divisional electromotive forces of the said divided source, means for controlling said switches to cause said motor to be accelerated and retarded and to regenerate electric energy when retarded, automatic means for operating said controller means, and manual means for controlling said automatic means.

21. In a system of control, the combination of a motor, a variable voltage source of energy, a controller of the separately actuated contact type, and electrically controlled means for controlling the operation of the separately actuated contacts to cause acceleration of the motor and also to cause the motor to generate electric energy for braking purposes.

22. In combination, a motor generator, a motor, control apparatus arranged to connect said motor to the generator of the motor generator to cause the motor to operate as a motor or to connect the motor armature to the generator armature and the motor field winding to be separately excited to cause the motor to act as a generator driven by the load, said control apparatus including means for varying the generator field both when the motor is operating as a motor and as a generator, together with means for varying the excitation of the motor field.

23. In combination, an alternating current supply circuit, a motor generator operated therefrom, a motor having an armature and a field winding, control apparatus comprising means for varying the field excitation of the generator and for connecting the motor armature to the generator to cause the motor to operate as a generator driven by the load, whereby alternating current energy is regenerated and supplied to said supply circuit, and for varying the excitation of the motor field winding during the operation of the motor as a generator.

24. In combination, an alternating current supply circuit, a rotatable source of electromotive force, operated therefrom, a field winding therefor, a motor having an armature winding and a field winding, and electrically operated control apparatus for varying the energy in the field winding of said source and for controlling the operation of the motor armature winding as a motor and as a generator and for varying the excitation of the motor field winding.

25. The combination of a plurality of sources of electromotive force, an electromotive force producing device adapted to transform electrical energy into mechanical energy and vice versa, a plurality of independently automatically movable circuit controlling elements for controlling the circuit connections of said sources, a controller for controlling the automatic movement of said elements, automatic means for moving said controller, and means for controlling said automatic means whereby said device is caused to transform electrical energy into mechanical energy and vice versa.

26. The combination of a divided source of electromotive force, an electromotive force producing dynamo electric machine having a winding, a plurality of independently automatically movable circuit controlling elements for connecting said winding to said source for applying different voltage to said winding, a controller for controlling the automatic movement of said elements in a certain order to cause said winding to act as a motor winding or as a generator winding, and means for automatically moving said controller.

27. The combination of an alternating current supply circuit, a source of electromotive force, an electromotive force producer operatively related thereto, an electric motor, and means comprising at least one automatically moved circuit controlling element for connecting said producer and the armature of said motor in series across said source and for connecting said motor armature directly across said source.

28. The combination of a source of electromotive force, an electromotive force producer, an electric motor, means for varying the speed of the motor comprising at least one automatically movable element for causing the electromotive force of said producer to oppose that of said source and act in the same sense as that of the armature of said motor and also to act in the same sense as that of said source and oppose that of the motor armature, and manual means for controlling said element.

29. In a multiple unit control system, a plurality of electric motors, means for controlling the speed of the motors from each of a plurality of points, said means comprising coöperatively-related means for first varying the energy supplied to one element of the motors and for then varying the energy supplied to another element of the motors.

30. In a multiple unit control system, a plurality of electric motors, means for controlling the motors from each of a plurality of points, said means comprising voltage control means for affecting the armature circuit of the motors and coöperatively-related means for affecting the field strength of the motors independently of changes affecting the motor armatures.

31. In a multiple unit control system for controlling a common load, a plurality of electric motors, means for controlling the motors from each of a plurality of points, said means comprising a single controlling device, and automatically movable means controlled thereby for controlling the motors during acceleration, retardation and reverse movement.

32. In a multiple unit control system, a plurality of electric motors, means for controlling the motors from each of a plurality of points, said means comprising automatically movable devices at a plurality of points for controlling the voltage in the armature circuits of the motors, and means for controlling said automatically movable devices at the will of the operator.

33. The combination of a high tension alternating current supply circuit, a locomotive unit operated by energy therefrom, said unit comprising moving contact devices for making operative connection with said supply circuit, a static transformer having a primary winding connected with said moving contacts, means for deriving a divided source of electromotive force from energy supplied by said transformer, a motor for propelling the locomotive unit, and motor controlling means subjecting at least one element of the motor to different voltages derived from said transformer for electrically accelerating and electrically retarding the locomotive unit, said controlling means comprising a manually movable controlling element and an automatically movable controlling element controlled thereby.

34. The combination of an electric motor having an armature winding and a field winding, automatically movable controlling means therefor, said means comprising a single movable element by the movement of which the voltage applied to the motor armature and the energy in the field winding is controlled and the direction of rotation reversed, and a manually movable controlling element for controlling the automatic movement of said single movable element.

35. The combination of an electric motor having an armature winding and a field winding, an automatically movable controlling element, and means controlled by the automatic movement of said element for controlling the value of the voltage applied to the motor armature circuit and the energy in said field winding and for reversing the direction of rotation of the motor.

36. In a multiple unit control system, a plurality of electric motors acting upon a common load, a plurality of voltage controlling means corresponding to and for controlling said motors, a plurality of means located at different points adapted to be manually controlled selectively by the operator, and means controlled by said plurality of means for automatically controlling said plurality of voltage controlling means for increasing the speed of the motors and for decreasing the speed of the motors by causing at least one of them to act as a generator.

37. In a motor control system, a source of electric energy supplying different voltages, an electric motor, a manually movable controlling element, an automatically movable controlling element controlled thereby and adapted to control the acceleration of the motor, and means for automatically protectively controlling the movement of said automatically movable controlling element to limit the accelerating current to a predetermined amount.

38. The combination of an electric motor, automatic means for controlling the voltage impressed upon the motor armature and for reversing the direction of rotation of the motor, a single movable element for controlling said voltage controlling and reversing means, automatic means for moving said element, and manually movable means for controlling the automatic movement of said element.

39. In a multiple unit control system, a plurality of electric motors, a plurality of energy transformers corresponding to said motors, a plurality of means located on the units respectively and adapted to be manually controlled selectively by the operator, and automatically movable speed controlling means corresponding thereto respectively for controlling the multiple unit system to accelerate the units and to electrically retard the units by regeneration of electric energy.

40. The combination of an electric motor, and motor controlling means, said means comprising a manually movable controlling element, and automatic means controlled thereby for controlling the voltage applied to the motor armature circuit and for controlling the field strength of the motor and for also reversing the direction of rotation of the motor.

41. The combination of an electric motor, and means for controlling the motor, said means comprising automatic means for first controlling the field strength of the motor and then controlling the voltage applied to armature circuit of the motor and for reversing the direction of rotation of the motor.

42. In a multiple unit system, a plurality of inductive voltage devices located at different points, a plurality of electric motors corresponding thereto, a field winding of each of said motors being energized by a current different from its armature current, a plurality of automatically movable controlling devices corresponding to said motors, and means under the control of the operator for causing simultaneous movement of said controlling devices.

43. The combination of an electric motor having an armature circuit and a field circuit different from each other, controlling means for controlling the motor armature circuit and the motor field circuit, and automatic protective means for automatically limiting the energy taken by the motor without interrupting the supply of such energy.

44. In a multiple unit control system, a plurality of electric motors located at different points, a plurality of controlling mechanisms corresponding thereto for first controlling the motor armature circuit independently of field control and then controlling the field strength independently of armature control, and a device for simultaneously controlling said mechanisms.

45. In a multiple unit control system, a plurality of electric motors located at different points, each of said motors having a field winding energized by a current different from its armature current, a plurality of controlling mechanisms corresponding thereto for controlling in succession the armature current and the field current of said motors, means for simultaneously controlling said mechanisms, and automatic electro responsive means in at least one of the motor circuits for protectively controlling the energy taken by the motors.

46. The combination of an electric motor, automatically movable controlling apparatus for said motor comprising means for varying the voltage in the armature circuit and the energy in the field circuit of the motor and for reversing the direction of rotation of the motor, and a plurality of manually movable means under the control of the operator for selectively controlling said automatically movable apparatus.

47. The combination of an electric motor, a plurality of automatically movable motor controlling switches for varying the voltage impressed upon the motor armature circuit, controlling means therefor, and automatic means for controlling said controlling means, said controlling means being adapted to cause said motor to generate electric energy to retard the motor.

48. The combination of an alternating current supply circuit, an electric motor operated by energy derived therefrom, means for automatically accelerating the motor, said means comprising a plurality of electrically automatically movable elements controlling the motor armature circuit and a field circuit of the motor, said field circuit having a current different from that in the armature circuit, and a plurality of manually movable devices for selectively controlling said means.

49. In a multiple unit control system, a plurality of electric motors, a plurality of devices for supplying thereto different voltages, automatic means for accelerating and retarding said motors, said retardation being produced by causing the motors to act as generators, and means under the control of the operator for controlling said acceleration and retardation from any one of a plurality of different points.

50. The combination of an alternating current supply circuit, a source of electromotive force operated by energy taken therefrom, an auxiliary source of electromotive force, an electric motor having a winding adapted to produce an electromotive force, automatically movable circuit controlling elements for controlling the relation between said sources of electromotive force and the electromotive force of said motor, and means under the control of the operator at a plurality of different locations for controlling at will from any one of said locations the automatic movement of said elements.

51. In a multiple unit control system, a plurality of electric motors working upon a common load, and means under the control of the operator from any one of a plurality of points for causing regenerative braking of the load by successively controlling in enforced sequence the field circuit and the armature circuit of said motors.

52. The combination of a plurality of electric motors, a plurality of electric energy transformers, the secondary windings of said transformers being adapted to be connected to the armatures of said motors for supplying different voltages thereto, a plurality of contactors for making said connections for accelerating the motors by closing said contactors in a certain order, and means located at a plurality of different points and controllable at will by the operator from any one of said points for controlling the closure of said contactors in proper sequence and electrical relation to each other for simultaneously accelerating the motors.

53. The combination of a plurality of electric motors, a plurality of electric energy transformers, the secondary windings of said transformers being adapted to be connected to the armatures of said motors for supplying different voltages thereto, a plurality of contactors for making said connections for accelerating and retarding the motors by closing said contactors in a certain order, and means located at a plurality of different points and controllable at will by the operator from any one of said points for controlling the closure of said contactors in proper sequence and electrical relation to each other for simultaneously accelerating and retarding the motors.

54. The combination of a plurality of electromotive force producing windings, means for varying the electromotive force delivered by said windings, a plurality of electric motors, connections for causing each of said windings to supply energy to its respective motor or motors independently of the other of said windings, means for simultaneously varying the magnetic fields of the motors, and electrically actuated controlling means for controlling the motors by controlling said first named means and also said second named means.

55. The combination of a plurality of generators adapted to act jointly in supplying energy for the movement of a common load, a plurality of independently automatically movable circuit controlling elements for controlling the circuits of the armature windings of said generators, and a controller for controlling the automatic movement of said elements in definite sequence.

56. The combination of a plurality of generators, a plurality of motors, each of said generators, and each of said motors having a field winding, a source of electromotive force for exciting said field windings independently of the electromotive forces of said generators, and a plurality of automatic switches for controlling the connections of the armatures of said generators and motors, the coils of said switches being supplied with energy from said source.

57. An electric motor having a field winding, a source of electric energy for supplying current to the armature of said motor, an electro-magnetically operated switch for reversing the direction of rotation of the motor and having a switch element adapted to control the motor armature circuit, said switch element having an actuating coil, and a separate source of electromotive force for supplying energy to said actuating coil and to said field winding.

58. A generator armature, a field winding therefor, a motor armature, a field winding therefor, a separate source of electromotive force adapted to supply energy to said field windings, and means for reversing the direction of rotation of the motor, said means comprising a controlling element and an electro-magnetically operated switch having its controlling winding connected to said separate source and the switch element of which controls the circuit of said armatures, said reversing means and said switch being controlled by movement of said controlling element.

59. A plurality of sources of electromotive force, a plurality of motors supplied with energy therefrom, said motors each having a motor armature and a field winding cooperating therewith respectively, a plurality of magnetically operated switches for controlling the circuit connections of said motor armatures, and a separate source of electromotive force for supplying current to the field windings of said motors and to the actuating windings of said switches.

60. A plurality of sources of electromotive force, a plurality of motors supplied with energy therefrom, a plurality of electro-magnetically operated switches for controlling the armature circuits of said motors, a separate source of electromotive force supplying the actuating windings of said switches, and a master controller for controlling the windings of said switches.

61. A plurality of generators, a plurality of motors, the armatures of said motors being supplied with energy from the armatures of said generators, a plurality of electro-magnetically operated switches for changing the circuit connections between said generator armatures and said motor armatures, and a master controller for controlling the operation of said switches.

62. A source of electromotive force, an electric motor having the armature winding thereof supplied with energy derived from said source, said motor having a field winding, a plurality of electro-magnetically operated switches for controlling the circuit of the motor armature, and a separate source of electromotive force for supplying energy to the actuating windings of said switches and supplying said field winding of the motor.

63. A plurality of generators, a plurality of motors, the armatures of said motors being supplied with energy from the armatures of said generators, a plurality of electro-magnetically operated switches controlling the connections of said generator armatures to said motor armatures, and a separate source of electromotive force for exciting the fields of said generators and of said motors and also the actuating windings of said switches.

64. The combination of a plurality of generators, a plurality of electric motors, a common load element driven by said motors, connections for causing each of said generators to supply energy to its respective motor or motors independently of the other of said generators, means for gradually and simultaneously varying the electromotive force of said generators, and means operatively related to said first named means for gradually and simultaneously varying the field strength of said motors.

65. The combination of a plurality of sources of electric energy adapted to act jointly in supplying energy for the movement of a common load, a plurality of automatic circuit controlling elements for controlling the energy supplied by said sources, and a controller for controlling the automatic operation of said elements.

66. A generator armature, a field winding therefor, a motor armature, a field winding therefor, a separate source of electromotive force adapted to supply energy to said field windings, and an electro-magnetically operated movable element having its controlling winding connected to said separate source and the movable element of which reverses the direction of current in the circuit of at least one of said field windings.

67. The combination of a dynamo armature, a field winding therefor, a translating device supplied with current from said armature, means comprising a movable circuit controlling element for controlling the current in said field winding, and an electro-magnetic winding responsive to the total current supplied by said armature to said translating device for controlling the movement of said element.

68. A dynamo-electric generator, a device producing an electromotive force counter to that of the armature of said generator in a circuit containing said armature and said device, an electro-responsive winding in the path of the total current from said armature to said device, a movable circuit controlling element controlled by said winding, and means controlled by the movement of said movable element for controlling the field strength of said generator.

69. The combination of a dynamo, a counter electromotive force producing device, an electro-magnetic winding, said device and said winding and the armature of said dynamo being connected in series in a circuit, the entire current to said device passing through said winding, an automatically movable circuit controlling device controlled by said winding, and means controlled by the automatic movement of said latter device for controlling the output of said dynamo.

70. The combination of a dynamo, a device adapted to produce an electromotive force counter to that of the armature of said dynamo, a self-closing switch adapted when closed to connect the dynamo armature and said device in a local circuit, an electro-responsive winding connected to said circuit and responsive to a maximum condition of energy in said circuit, a movable circuit controlling element automatically controlled by said winding, and means controlled by the automatic movement of said element for controlling the field strength of said dynamo.

71. The combination of a dynamo, a device adapted to produce an electromotive force counter to that of the armature of said dynamo, a self-closing switch adapted when closed to connect the dynamo armature and said device in a local circuit, an electro-responsive winding connected in said circuit so as to carry the entire current from the dynamo-armature to said device and responsive to a maximum current in said circuit, a movable circuit controlling element automatically controlled by said winding, and means controlled by the automatic movement of said element for controlling the field strength of said dynamo.

72. The combination of an electric motor, means for automatically accelerating said motor, said means comprising a master-switch, electro-responsive means controlled thereby, a circuit controller automatically moved by said last named means, a plurality of contactor type switches controlled by said controller, so as to operate in definite sequence, and automatic electro-responsive means responsive to a condition causing an increase in the current through the motor armature for automatically limiting without interrupting said armature current.

73. The combination of an electric motor, means for automatically retarding said motor, said means comprising a master-switch, electro-responsive means controlled thereby, a circuit controller automatically moved by said last named means, a plurality of contactor type switches controlled by said controller so as to operate in definite sequence, and automatic electro-responsive means responsive to a condition causing an increase in the current through the motor armature for automatically limiting without interrupting said armature current.

74. In a multiple unit control system, means for automatically accelerating the units, said means comprising a motor for driving each unit, a master-switch, electro-responsive means controlled by said switch, a multiple unit controller automatically moved by said last named means, a plurality of contactor type switches corresponding to each unit and controlled by said controller so as to operate in definite sequence, and electro-responsive means responsive to a condition causing an increase in the current through the motor armatures for automatically limiting without interrupting said armature current.

75. In a multiple unit control system, means for automatically retarding the units, said means comprising a motor for each unit, a master-switch, electro-responsive means controlled by said switch, a multiple unit controller automatically moved by said last named means, a plurality of contactor type switches corresponding to each unit and controlled by said controller so as to operate in definite sequence, and electro-responsive means responsive to a condition causing an increase in the current through the motor armatures for automatically limiting without interrupting said armature current.

76. The combination of a high-tension alternating current supply circuit, a locomotive unit operated by energy derived therefrom, said unit comprising moving contact devices for making operative connection with said supply circuit, energy transforming means for receiving the high tension alternating current and deriving therefrom multiple voltages supplying a plurality of multiple voltage conductors, a propelling motor, and motor controlling means comprising a manually movable controlling element and an automatically movable controlling element controlled thereby for supplying at least one element of the motor with energy at different voltages from said conductors, said energy being unidirectional.

77. The combination of a source of high-tension energy, a plurality of locomotive units operating upon a common load, each of said units comprising means for transforming high-tension energy into multiple voltage low voltage energy, a propelling motor, motor controlling means for operating at least one element of the motor with energy at different voltages from said multiple voltage energy, and multiple unit controlling means comprising a master controller on each of said units, whereby the operator can operate the plurality of locomotive units from each of the units and cause braking of the common load by causing said motor upon each of said units to generate electric energy.

78. The combination of a source of high-tension single phase energy, a plurality of locomotive units operatively connected to a common load, each of said units comprising means for collecting energy from said high-tension source and deriving therefrom lower voltage energy at a plurality of different voltages, a propelling motor, motor controlling means for subjecting at least one element of the motor to said different lower voltages, and multiple unit controlling means comprising energy transmitting means connecting the units for transmitting control energy, a multiple unit controller upon each of said units, and a master controller upon each of said units adapted to be moved by the operator for controlling the operation of the multiple unit controller on its respective unit and thereby jointly control from that unit the operation of the plurality of said locomotive units.

79. The combination of a high-tension alternating current source of energy, a plurality of locomotive units operatively connected to a common load, each of said units comprising means for receiving energy from said high-tension source and for transforming energy and delivering unidirectional electric energy in the form of lower voltage energy at a plurality of different voltages, a propelling motor, motor controlling means for subjecting at least one element of the motor to said different lower voltages, and multiple unit controlling means for controlling the joint action of the said units comprising means connecting the units for transmitting control energy, multiple unit controllers upon each of said units for controlling the joint action of said locomotive units, means operatively connected with each of said multiple unit controllers for automatically moving each controller respectively, a master controller upon each of said units, and means connecting each of said master controllers with its corresponding operating means whereby the operator may control from any one of said units the joint action of said units.

In testimony whereof I affix my signature, in presence of two witnesses.

H. WARD LEONARD.

Witnesses:
R. J. ROBERTSON,
GEO. J. SCHELZ, Jr.

---

Copies of this patent may be obtained for five cents each, by addressing the "Commissioner of Patents, Washington, D. C."

---

Corrections in Letters Patent No. 1,043,777.

It is hereby certified that in Letters Patent No. 1,043,777, granted November 5, 1912, upon the application of Harry Ward Leonard, of Bronxville, New York, for an improvement in "Means for Control of Electric Energy," errors appear in the printed specification requiring correction as follows: Page 7, lines 122–123, for the word "controller" read *controlling;* page 8, line 63, for the word "voltage" read *voltages;* and that the said Letters Patent should be read with these corrections therein that the same may conform to the record of the case in the Patent Office.

Signed and sealed this 17th day of December, A. D., 1912.

[SEAL.]

C. C. BILLINGS,
*Acting Commissioner of Patents.*